United States Patent
Sun et al.

(10) Patent No.: US 11,428,078 B2
(45) Date of Patent: Aug. 30, 2022

(54) SYSTEMS AND METHODS FOR FORECASTING WELL PRODUCTIVITY

(71) Applicant: HALLIBURTON ENERGY SERVICES, INC., Houston, TX (US)

(72) Inventors: Jianlei Sun, Katy, TX (US); Youli Mao, Houston, TX (US); Dwight Fulton, Cypress, TX (US); Jianfu Ma, Pearland, TX (US); Peng Zhang, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 560 days.

(21) Appl. No.: 16/509,216

(22) Filed: Jul. 11, 2019

(65) Prior Publication Data

US 2021/0010351 A1    Jan. 14, 2021

(51) Int. Cl.
| | |
|---|---|
| *E21B 41/00* | (2006.01) |
| *G06Q 10/06* | (2012.01) |
| *G06N 3/08* | (2006.01) |
| *G06N 20/00* | (2019.01) |
| *G06Q 50/02* | (2012.01) |

(52) U.S. Cl.
CPC .......... *E21B 41/0092* (2013.01); *G06N 3/08* (2013.01); *G06N 20/00* (2019.01); *G06Q 10/06315* (2013.01); *G06Q 50/02* (2013.01)

(58) Field of Classification Search
None
See application file for complete search history.

(56) References Cited

U.S. PATENT DOCUMENTS

| | | | |
|---|---|---|---|
| 7,747,641 B2 | 6/2010 | Kim et al. | |
| 2018/0335538 A1* | 11/2018 | Dupont | G06Q 10/04 |
| 2020/0160173 A1* | 5/2020 | Pandey | G01V 99/005 |

OTHER PUBLICATIONS

Panja, Palash & Velasco, Raul & Pathak, Manas & Deo, Milind. (2017). Application of artificial intelligence to forecast hydrocarbon production from shales. Petroleum. 4. 10.1016/j.petlm.2017.11.003; 15 pages.
Cao, Q. et al.; Data Driven Production Forecasting Using Machine Learning; SPE-180984-MS; 2016; 10 pages.
Sun, J. et al; Comparison of Decline Curve Analysis DCA with Recursive Neural Networks RNN for Production Forecast of Multiple Wells; SPE-190104-MS; 2018; 11 pages.
Gupta, S. et al.; A Statistical Engine to Model Well Operations and Evaluate Asset Performance; SPE-191777-MS; 2018; 8 pages.

* cited by examiner

*Primary Examiner* — Syed A Roni
(74) *Attorney, Agent, or Firm* — Novak Druce Carroll LLP

(57) ABSTRACT

Disclosed are systems and methods for obtaining an input sequence of input data features associated with a well for at least one time stamp during a period of time including well production rates for the well and well operation constraints for the well, dividing the input data features into a training data subset, a validation data subset, and a test data subset, building a well production model for the well using machine learning based on the training data subset, the validation data subset, and the test data subset, and generating a forecast for the well for a future period of time using the well production model, the forecast comprising a future well production rate for the well including at least one of an oil rate, a gas rate, and a water rate.

17 Claims, 11 Drawing Sheets

SYSTEMS AND METHODS FOR FORECASTING WELL PRODUCTIVITY

TECHNICAL FIELD

The present technology pertains to forecasting well productivity and more specifically to forecasting well productivity accurately and efficiently, in real-time or offline design, using deep learning and neural networks.

BACKGROUND

Production forecasting and reservoir management is used for oilfield development and planning. Conventional approaches include numerical simulation of fluid flow through porous media by solving partial differential equations (PDE), analytic solution of semi-analytical approximations, or empirical decline curve analysis (DCA) including use of the Arp's model, the Duong Model or Stretched Exponential Decline (SEPD). However, these approaches are limited and either too time-consuming and cost-prohibitive, or too simplified.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
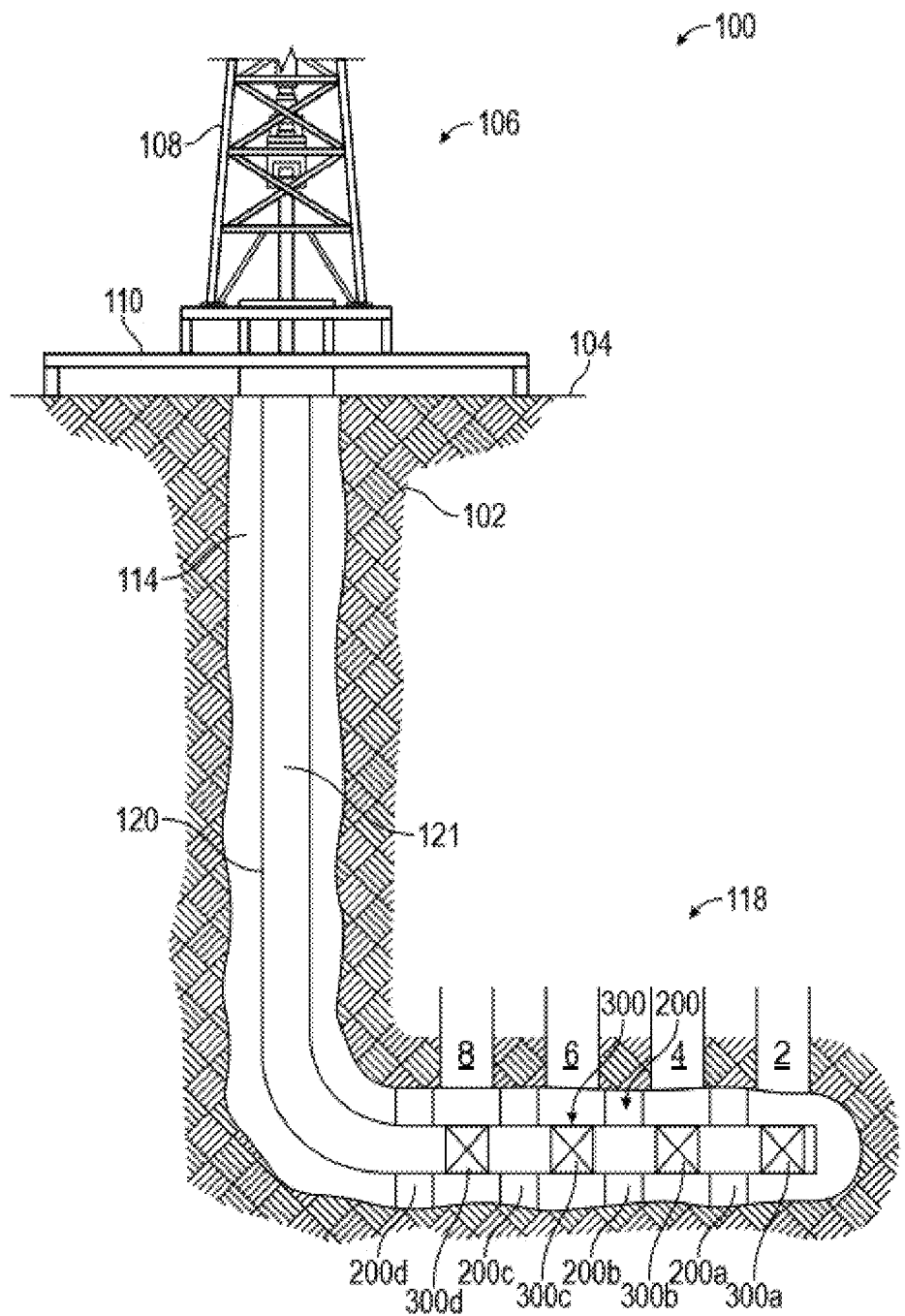
FIG. 1 is a schematic diagram of a wellbore operating environment that may include a well productivity system, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents. The various characteristics described in more detail below, will be readily apparent to those skilled in the art with the aid of this disclosure upon reading the following detailed description, and by referring to the accompanying drawings.

Disclosed herein are systems, methods, and computer-readable storage media for forecasting well productivity accurately and efficiently using deep learning neural networks. A well productivity system may apply deep learning techniques such as long-short term memory (LSTM) or gated recurrent unit (GRU) and/or convolutional neural networks (CNN) to forecast well production rates and optimize corresponding development and completion strategies for one or more wells.

First, the system may retrieve or obtain production rates and well operation constraints from one or more sources such as one or more databases. The system also may retrieve or obtain other temporal and spatial measurement data associated with the one or more wells. Next, the system may perform exploratory data analysis and extract preliminary information from the production rates and the well operation constraints. The system also may extract features and responses from the temporal data and the spatial data. The data may be divided into a training data subset, a validation data subset, and a test data subset.

Next, the system may use the training data subset, the validation data subset, and the test data subset to build and train a model using LSTM or GRU and/or CNN. The system may perform history matching and model training and perform model evaluation based on prediction accuracy of the test data subset. After the model is built and trained, the system can deploy the model on one or more computing devices and optimize well operation of one or more wells based on an oil recovery factor, net present value, and/or other Key Performance Indicators (KPI). The computing devices may be located at a wellbore operating environment and may be downhole and/or on the surface. In addition, the computing devices may also include a cloud computing device.

According to at least one aspect, an example method for forecasting well productivity accurately and efficiently, in real-time, using deep learning neural networks is provided. The method can include obtaining, by at least one processor, an input sequence of input data features associated with a well for at least one time stamp during a period of time, the input data features associated with the well for the at least one particular time stamp during the period of time comprising well production rates for the well and well operation constraints for the well, dividing, by the at least one processor, the input data features into a training data subset, a validation data subset, and a test data subset, building, by the at least one processor, a well production model for the well using machine learning based on the training data subset, the validation data subset, and the test data subset, and generating, by the at least one processor, a forecast for the well for a future period of time using the well production model, the forecast comprising a future well production rate for the well including at least one of an oil rate, a gas rate, and a water rate.

According to at least one aspect, an example system for forecasting well productivity accurately and efficiently, in real-time, using deep learning neural networks is provided. The system can include at least one processor coupled with at least one computer-readable storage medium having stored therein instructions which, when executed by the at least one processor, causes the system to obtain an input sequence of input data features associated with a well for at least one time stamp during a period of time, the input data features associated with the well for the at least one particular time stamp during the period of time comprising well production rates for the well and well operation constraints for the well, divide the input data features into a training data subset, a validation data subset, and a test data subset, build a well production model for the well using machine learning based on the training data subset, the validation data subset, and the test data subset, and generate a forecast for the well for a future period of time using the well production model, the forecast comprising a future well production rate for the well including at least one of an oil rate, a gas rate, and a water rate.

According to at least one aspect, an example non-transitory computer-readable storage medium for forecasting well productivity accurately and efficiently, in real-time, using deep learning neural networks is provided. The non-transitory computer-readable storage medium can include instructions which, when executed by one or more processors, cause the one or more processors to perform operations including obtaining an input sequence of input data features associated with a well for at least one time stamp during a period of time, the input data features associated with the well for the at least one particular time stamp during the period of time comprising well production rates for the well and well operation constraints for the well, dividing the input data features into a training data subset, a validation data subset, and a test data subset, building a well production model for the well using machine learning based on the training data subset, the validation data subset, and the test data subset, and generating a forecast for the well for a future period of time using the well production model, the forecast comprising a future well production rate for the well including at least one of an oil rate, a gas rate, and a water rate.

J. J. Arps determined a technically simple, easy-to-use mathematical relationship for the rate of oil production decline over time in the 1940s that is still used. On the other end of the spectrum, although extremely complicated numerical and empirical forecast simulations for oil production decline also have been developed, but they require a large amount of computing resources and time. Thus, conventional well production forecasting is either too simplistic or too complicated and intensive. As a result, previous attempts at forecasting well productivity are limited and too time-consuming, cost-prohibitive, or too simplified to incorporate realistic oilfield operation constraints that can provide real-time estimation of well productivity.

The disclosure discusses a data-driven approach to forecast single well production or multiple well production and may optimize well development planning efficiently and accurately using complex operation constraints. The approach discussed herein utilizes deep learning neural networks including, but not limited to, recurrent neural networks (RNN) such as long short-term memory (LSTM) or gated recurrent unit (GRU), and/or convolutional neural networks (CNN). As a result, the disclosure provides a way of using artificial intelligence to forecast future single well production or multiple well production based on historical input associated with one or more wells.

Figure 10:
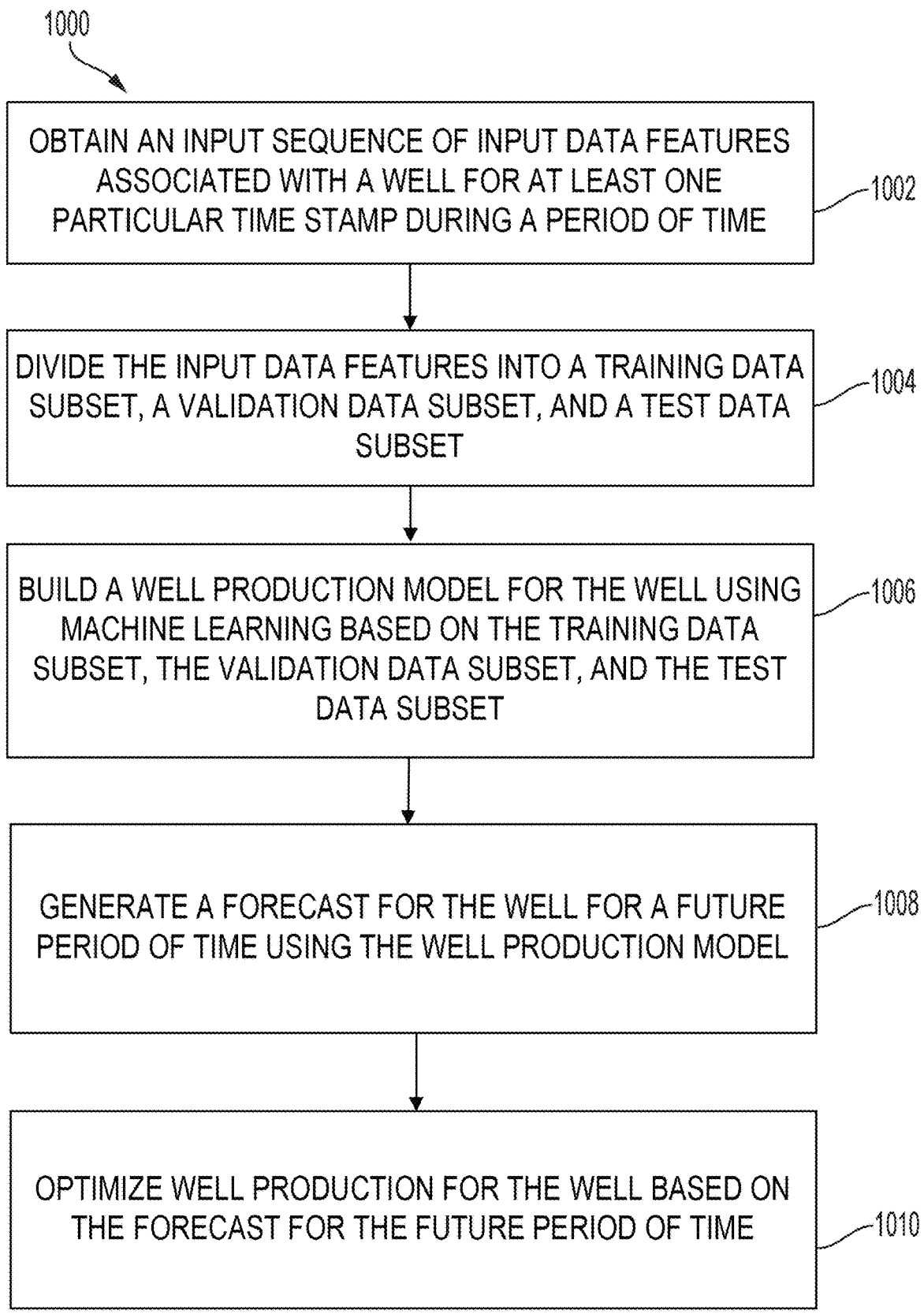
FIG. 10 is a flowchart of an example method for forecasting well productivity accurately and efficiently, in real-time, using deep learning and neural networks, in accordance with some examples.
Figure 11:
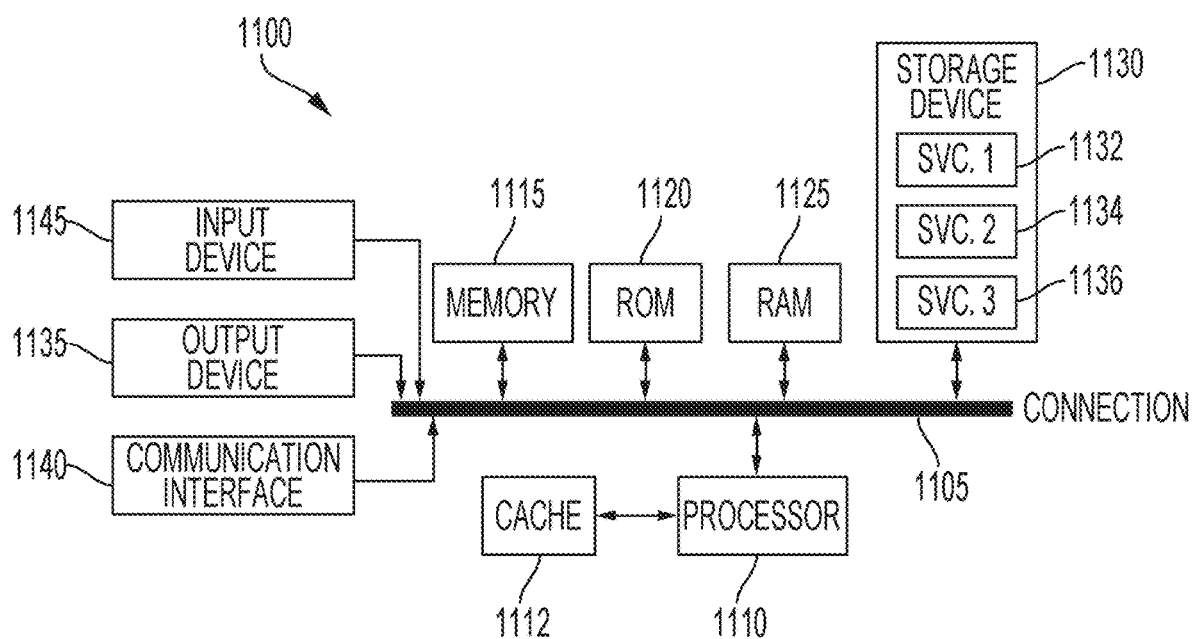
FIG. 11 is a schematic diagram of an example computing device architecture, in accordance with some examples.

As follows, the disclosure will provide a more detailed description of the systems, methods, computer-readable media and techniques herein for forecasting well productivity accurately and efficiently, in real-time, using deep learning neural networks. The disclosure will begin with a description of example systems and environments, as shown in FIGS. 1 through 9. A description of example methods and technologies for forecasting well productivity accurately and efficiently, in real-time, using deep learning neural networks, as shown in FIG. 10, will then follow. The disclosure concludes with a description of an example computing system architecture, as shown in FIG. 11, which can be implemented for performing computing operations and functions disclosed herein. These variations shall be described herein as the various embodiments are set forth.

FIG. 1 illustrates a schematic view of an embodiment of a wellbore operating environment 100 that may include a well productivity system. As depicted in FIG. 1, the operating environment 100 includes a wellbore 114 that penetrates a formation 102 that includes a plurality of formation zones 2, 4, 6, and 8 for the purpose of recovering hydrocarbons, storing hydrocarbons, injecting of water or carbon dioxide, or the like. As depicted in FIG. 1, formation 102 is a subterranean formation, although it is noted that formation 102 may be a subsea formation. The wellbore 114 may extend substantially vertically away from the Earth's surface over a vertical wellbore portion, or may deviate at any angle from the Earth's surface 104 over a deviated or horizontal wellbore portion 118. In alternative operating environments, portions or substantially all of the wellbore 114 may be vertical, deviated, horizontal, and/or curved. The wellbore 114 may be drilled into the formation 102 using any suitable drilling technique. As shown, a drilling or servicing rig 106 disposed at the surface 104 (which may be the surface of the Earth, a seafloor surface, or a sea surface) comprises a derrick 108 with a rig floor 110 through which a tubular string (e.g., a drill string, a tool string, a segmented tubing string, a jointed tubing string, or any other suitable conveyance, or combinations thereof) generally defining an axial flowbore may be positioned within or partially within the wellbore 114. The tubular strings may include two or more concentrically positioned strings of pipe or tubing (e.g., a first work string may be positioned within a second work string). The drilling or servicing rig 106 may be conventional and may include a motor driven winch and other associated equipment for lowering the tubular string into the wellbore 114. Alternatively, a mobile workover rig, a wellbore servicing unit (e.g., coiled tubing units), or the like may be used to lower the work string into the wellbore 114. In such an environment, the tubular string may be utilized in drilling, stimulating, completing, or otherwise servicing the wellbore, or combinations thereof. A drilling or servicing rig 106 may be comprised of other equipment.

While FIG. 1 depicts a stationary drilling rig 106, one of ordinary skill in the art will readily appreciate that mobile workover rigs, wellbore servicing units (such as coiled tubing units), and the like may be employed. In the context of subsea environments and/or subsea formations, one of ordinary skill in the art will appreciate that conventional fixed platforms, vertically moored platforms, spar platforms, semi-submersible platforms, floating production facilities, and sub-sea completion facilities and the like may be employed. It is noted that while the Figures or portions thereof may exemplify horizontal or vertical wellbores, the principles of the presently disclosed apparatuses, methods, and systems, may be similarly applicable to horizontal wellbore configurations, conventional vertical wellbore configurations, deviated wellbore configurations, and any combinations thereof. Therefore, the horizontal, deviated, or vertical nature of any figure is not to be construed as limiting the wellbore to any particular configuration or formation.

As depicted in FIG. 1, at least a portion of the wellbore 114 is lined with a wellbore tubular 120 such as a casing string and/or liner defining an axial flowbore 121. In at least some instances, one or more packer assemblies 200, such as a first packer assembly 200a, second packer assembly 200b, third packer assembly 200c, and fourth packer assembly 200d, may be disposed within the wellbore 114. In some instances, the one or more packer assemblies 200 may be used to isolate two or more adjacent portions or zones within formation 102 and/or wellbore 114. In some cases, the one or more packer assemblies 200 are operable to engage and/or seal against an outer tubular string such as tubular string 120. According to at least one aspect of the present disclosure, at least a portion of the wellbore tubular 120 is secured into position against the formation 102 via a plurality of packer assemblies 200, such as assemblies 200a-200d. In at least some instances, a portion of the wellbore tubular 120 may be partially secured into position against the formation 102 via cement, e.g. when wellbore tubular 120 is a casing.

As depicted in FIG. 1, the operating environment 100 may further include at least one downhole tool 300 (e.g., a first downhole tool 300a, a second downhole tool 300b, a third downhole tool 300c, and a fourth downhole tool 300d). The downhole tools may be any variety of downhole tools such as a plug, a sleeve, a valve, a piston, a sensor, or an actuator to inflate the packers 200, or other devices. The operating environment 100 may include a system for forecasting well productivity.

Disclosed herein are systems and methods for forecasting well productivity accurately and efficiently, in real-time, using deep learning neural networks. A well productivity system may apply deep learning techniques such as LSTM or GRU and/or CNN to forecast well production rates and optimize corresponding development and completion strategies for one or more wells.

First, the system may retrieve or obtain production rates and well operation constraints from one or more sources such as one or more databases. The system also may retrieve or obtain other temporal and spatial measurement data associated with the one or more wells. Next, the system may perform exploratory data analysis and extract preliminary information from the production rates and the well operation constraints. The system also may extract features and responses from the temporal data and the spatial data. The data may be divided into a training data subset, a validation data subset, and a test data subset.

The system and method may include development of a model that captures time-dependency of well-production responses on previous production history and localized features. The model may learn from previous production history and corresponding temporal and spatial input data to determine when, where, and how to capture information that impacts future well production forecasts. Conventional solutions use traditional numerical simulators, but the model generated by the system and method improves upon itself quickly and efficiently based on historical information to provide improved model-based predictions. The systems and methods discussed herein greatly improve and hasten model building, history-matching, and model prediction when compared to a traditional numerical simulator based approach.

The model can be trained using time series related data and image data such as well log information, four-dimensional seismic information, and pumping schedule information. In addition, the model is a sequence-to-sequence model. In other words, the input data may include a sequence of time-series variables and the output data may include a sequence of three-phase production rates including water rates, oil rates, and gas rates and/or reservoir pressure. Thus, the system and method can be used to predict maintenance and equipment failure for one or more wells and/or one or more oilfields.

Deep learning techniques may be used to forecast well production rates and optimize corresponding development and well completion strategies. The deep learning techniques may include LSTM or GRU and/or CNN. In a first step, temporal and spatial data is collected. Production rates and well operation constraints and other optional temporal and spatial measurement data may be collected. The temporal and spatial data may be retrieved from available datasets from on-premise computing devices and/or cloud computing devices. A new database may be created that may store the temporal and the spatial data. The new database may be stored by the cloud computing device as part of a virtual private cloud.

The temporal data may include well production response information such as oil rates, gas rates, and water rates. The temporal data also may include well operation constraint information such as wellhead or bottomhole pressure information and choke size information. Other input data may include drilling and well completion design information (e.g., fracturing design information and pumping schedule information), well interference test information, well logs, and seismic images. The input data may be obtained from one or more sources and stored in the new database. In one example, the input data may include wellhead tubing pressure and production rates for one or more wells.

After the new database is created with the input data, the input data may be engineered and transformed. This may include performing exploratory data analysis and extracting preliminary insights from the input data. Features and responses may be extracted from the temporal data and features from the spatial data may be extracted based on domain knowledge in drilling, completion engineering, and reservoir and production engineering. The input data may then be scaled and divided into subsets including a training subset, a validation subset, and a test subset.

Data exploratory analysis may focus on identification of features that impact well production based on domain knowledge. As an example, if the input production rates indicate that there were frequent well shut-in and pressure build-up tests, this information should be used to train a model to learn underlying physics associated with one or more wells. This may assist in well production forecasting and allow one or more wells to be categorized into a group having similar rock and fluid properties.

Historical production rates (i.e., oil rates, gas rates, and water rates) may be used to determine gas-oil ratio information, water-oil information, and cumulative water/hydrocarbon production volume. Well operation constraints such as wellhead tubing pressure and choke size may be taken into consideration to handle complex production forecasting and well-development optimization tasks.

The temporal features may include production rates such as oil rate, gas rate, and water rate, rate ratios such as water-oil ratio, gas-oil ratio, gas-liquid ratio, hydrocarbon-water ratio, cumulative production such as cumulative oil volume, cumulative gas volume, and cumulative water volume, well operation constraints such as tubing head pressure, casing pressure, and choke size, and other information including hydraulic fracturing pumping schedule, real-time production surveillance, and multiple well interference test information. The spatial features may be related to static data or images related to drilling and completion (i.e., well trajectory, spacing, true vertical depth), formation evaluation, well logs, cores, and laboratory measurement information.

The spatial features may include well trajectory information including true vertical depth, latitude, longitude, measured depth, horizontal well lateral length, multiple well spacing information, and parent-child well relationship information. In addition, the spatial features may include geological map information such as structural maps, formation top information, interpreted geomodel map information such as porosity and pressure. The spatial features also may include well log information including gamma ray, density, and resistivity information. Additionally, the spatial features may include laboratory data including routine core or special core analysis, chemical additives associated with the well including surfactant, microproppants, friction reducer, clay control, and other information.

Based on the temporal features and the spatial features, production rates may be forecasted including an oil rate, a gas rate, and/or a water rate. The geological maps and well logs may be input as images and preprocessed using machine learning to generate an embedding space (i.e., additional feature columns such as reservoir properties for the zone of interest). The feature columns may be extracted from the spatial datasets and converted to time series features. The time series related features from the temporal and the spatial data may be combined to form a dataset that is divided into subsets including a training subset, a validation subset, and a test subset.

For a single well, the dataset may be divided into a training part, a validation part, and a test part and a window interval may move from a beginning of the time series until an end of the time series. A length of the training/validation/test data may be varied to optimize the model and an overall model prediction accuracy may be based on an averaged evaluation score of test data subsets. If the data is associated with more than one well, then the data may be divided into subsets and a total number of wells may be randomly divided into a training subset, a validation subset, and a test subset. As an example, m and n wells may be selected to train a model and validate the accuracy of the training process. Next, the remaining L wells may be used to test and evaluate model accuracy.

The model can be generated using a many-to-many time series model architecture. Input features from one or more time stamps or periods of time (i.e., an input sequence) can be used to forecast an output response at multiple time stamps or periods of time in the future. A time stamp may represent input for a period of time such as one day or one week, or another period of time. As an example, the input sequence may include a temporal time series, spatial numerical data, spatial images or maps, and well constraint information. Each time stamp may be associated with temporal data, spatial numerical data, spatial image information, and well constraint information. The model may use input features from one or more time stamps as an input sequence (i.e., six previous time stamps) in a bottom input layer, perform machine learning over a hidden middle layer, and generate an output of production responses across a same or fewer time stamps (i.e., three time stamps) in an output layer. The hidden middle layer may include RNN neurons and the model architecture may be based on LSTM or GRU.

Hyper parameters may be tuned for the model and may include a number of time stamps for the input sequence, a number of time stamps for an output sequence, and CNN-related parameters such as kernel size, pooling size, dropout rate, and learning rate, among others. The model may be based on LSTM or GRU that determines output responses based on input previous production rates, well operation constraints, and spatial static data and images. Features may be extracted from the spatial static data and images using CNN.

After the model is trained and validated, a step forward forecast can be performed for one time stamp or multiple time stamps at a time. In addition, the model can be used for one well or multiple wells to forecast future production.

Figure 2:
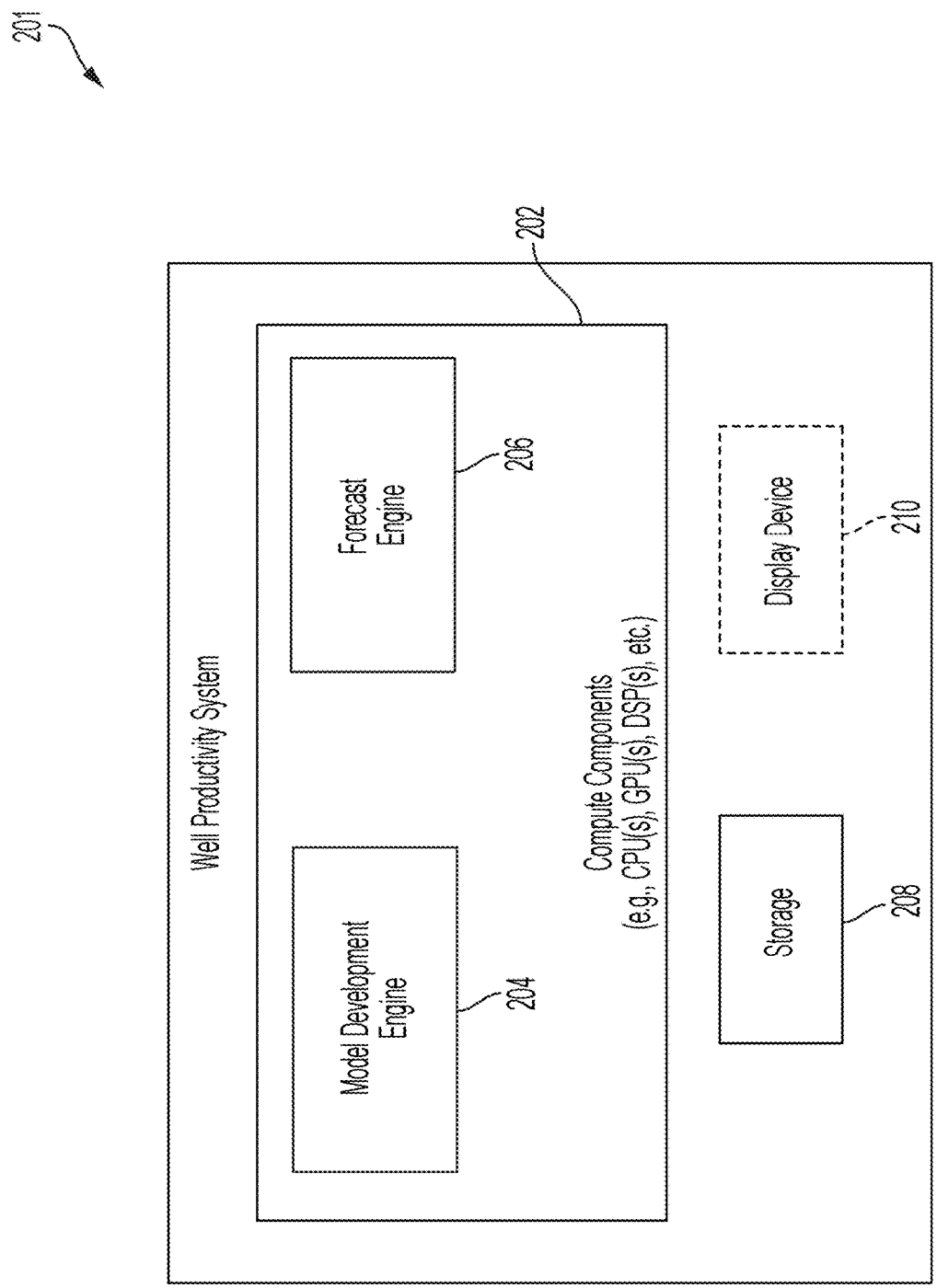
FIG. 2 is a block diagram of the well productivity system which may be implemented to forecast well productivity, in accordance with some examples.

FIG. 2 illustrates a well productivity system 201 according to an example. The well productivity system 201 can be implemented for forecasting well productivity accurately and efficiently, in real-time, using deep learning neural networks as described herein. In this example, the well productivity system 201 can include compute components 202, a model development engine 204, a forecast engine 206, and a storage 208. In some implementations, the well productivity system 201 can also include a display device 210 for displaying data and graphical elements such as images, videos, text, simulations, and any other media or data content.

The well productivity system 201 may be physically located at the wellbore operating environment 100. Components of the well productivity system 201 may be located downhole and/or on the surface. In addition, the well productivity system 201 may be executed by a computing device such as compute components 202 located downhole and/or on the surface. In one example, the well productivity system 201 may be executed by one or more server computing devices such as a cloud computing device in communication with the well productivity system 201.

The well productivity system 201 can be part of, or implemented by, one or more computing devices, such as one or more servers, one or more personal computers, one or more processors, one or more mobile devices (for example, a smartphone, a camera, a laptop computer, a tablet computer, a smart device, etc.), and/or any other suitable electronic devices. In some cases, the one or more computing devices that include or implement the well productivity system 201 can include one or more hardware components such as, for example, one or more wireless transceivers, one or more input devices, one or more output devices (for example, display device 210), the one or more sensors (for example, an image sensor, a temperature sensor, a pressure sensor, an altitude sensor, a proximity sensor, an inertial measurement unit, etc.), one or more storage devices (for example, storage system 208), one or more processing devices (for example, compute components 202), etc.

As previously mentioned, the well productivity system 201 can include compute components 202. The compute components can be used to implement the model development engine 204, the forecast engine 206, and/or any other computing component. The compute components 202 can also be used to control, communicate with, and/or interact with the storage 208 and/or the display device 210. The compute components 202 can include electronic circuits and/or other electronic hardware, such as, for example and without limitation, one or more programmable electronic circuits. For example, the compute components 202 can include one or more microprocessors, one or more graphics processing units (GPUs), one or more digital signal processors (DSPs), one or more central processing units (CPUs), one or more image signal processors (ISPs), and/or any other suitable electronic circuits and/or hardware. Moreover, the compute components 202 can include and/or can be implemented using computer software, firmware, or any combination thereof, to perform the various operations described herein.

The model development engine 204 can be used to obtain data, process data, analyze data, and generate one or more models that can be used by the forecast engine 206 to forecast well production for one or more wells. The model development engine 204 captures time-dependency of well production responses on previous production history for one or more wells and also captures localized features such as workover operations. The model generated by the model development engine 204 learns from previous production history and corresponding temporal and spatial input data to decide when, where, and how to capture details that impact future production forecasts for the one or more wells. The model can also learn and be trained based on images such as well logs, four-dimensional seismic data, and pumping schedule information.

The model development engine 204 can receive input data associated with one well or more than one well. The input data may be retrieved from an on-premise database and/or a cloud data warehouse and stored in a database. The database may be associated with the well productivity system 201 and may be provided by a virtual private cloud. As a further example, the input data may include production rates for a well for a plurality of particular time periods (i.e., a plurality of days) over a larger period of time (i.e., a plurality of months or a plurality of years) and well operation constraint information for the plurality of particular time periods (i.e., the plurality of days) over the larger period of time. The production rates may be an oil rate, a gas rate, and/or a water rate. The well operation constraint information may be tubing head pressure, casing pressure, and choke size, among others.

The model development engine 204 also may take additional information and data into consideration. The model development engine 204 also may receive other data and information such as rate ratios, cumulative production information, and other information including hydraulic fracture pumping schedule data, real-time production surveillance, and multiple well interference test information, among others. The model development engine 204 also may receive optional spatial features including well trajectory information, geological maps, well logs, and laboratory data. In other words, the input data may include temporal time series data, spatial images or maps, spatial numerical data, and well constraint information.

Using the input data, the model development engine 204 can generate a model that may be used to generate output data or production rate of one or more of an oil rate, a gas rate, and a water rate. First, the model development engine 204 may divide the input data into a training data subset, a validation data subset, and a test data subset. The model development engine 204 may use the training data subset, the validation data subset, and the test data subset to gradually improve the accuracy of the model.

The model development engine 204 may include an input layer that includes an input sequence of input data associated with one or more time stamps. The input layer may be processed by a hidden layer such as an LSTM or GRU layer to generate an output of production responses for a same or fewer number of time stamps as the input layer. As an example, the input sequence may include input data associated with one or more input days and the model development engine 204 may process the input data using the LSTM or GRU layer to generate an output of production responses for a number of output days less than the one or more input days. The production responses may be one or more of an oil rate, a gas rate, and a water rate per day or per month.

The model development engine 204 may communicate with another computing device such as a computing device associated with the virtual private cloud. The model development engine 204 may deploy the model to the virtual private cloud.

The forecast engine 206 uses the model that is continually learning and receiving input data by the model development engine 204 to generate and provide output data comprising production rates for one or more wells. The production rates may include a gas rate, an oil rate, and a water rate for a particular period of time such as one day. In addition, the forecast engine may determine averaged reservoir pressure.

The forecast engine 206 can be used to provide maintenance predictions and schedule maintenance for one or more wells and can be used to provide equipment failure diagnosis for the one or more wells. The forecast engine 206 also may be used to optimize well completion in order to maximize an oil recovery factor and/or a net present value (NPV) and/or other KPI of the one or more wells.

As an example, the forecast engine 206 may be used to modify input constraints associated with the one or more wells such as a pumping schedule of hydraulic fracture treatment, a number of stages, and types of fluid systems (i.e., slick water with friction reducer, linear gel), among other input constraints. As another example, a water flooding field development plan can be optimized by modifying input constraints by the forecast engine 206 such as a water injection period or a water amount. Other modifications and adjustments to input constraints are possible.

The storage 208 can be any storage device(s) for storing data. In some examples, the storage 208 can include a buffer or cache for storing data for processing by the compute components 202. Moreover, the storage 208 can store data from any of the components of the well productivity system 201. For example, the storage 208 can store input data used by the well productivity system 201, outputs or results generated by the well productivity system 201 (for example, data and/or calculations from the model development engine 204, the forecast engine 206, etc.), user preferences, parameters and configurations, data logs, documents, software, media items, GUI content, and/or any other data and content.

While the well productivity system 201 is shown in FIG. 2 to include certain components, one of ordinary skill in the art will appreciate that the well productivity system 201 can include more or fewer components than those shown in FIG.

2. For example, the well productivity system 201 can also include one or more memory components (for example, one or more RAMs, ROMs, caches, buffers, and/or the like), one or more input components, one or more output components, one or more processing devices, and/or one or more hardware components that are not shown in FIG. 2.

Figure 3:
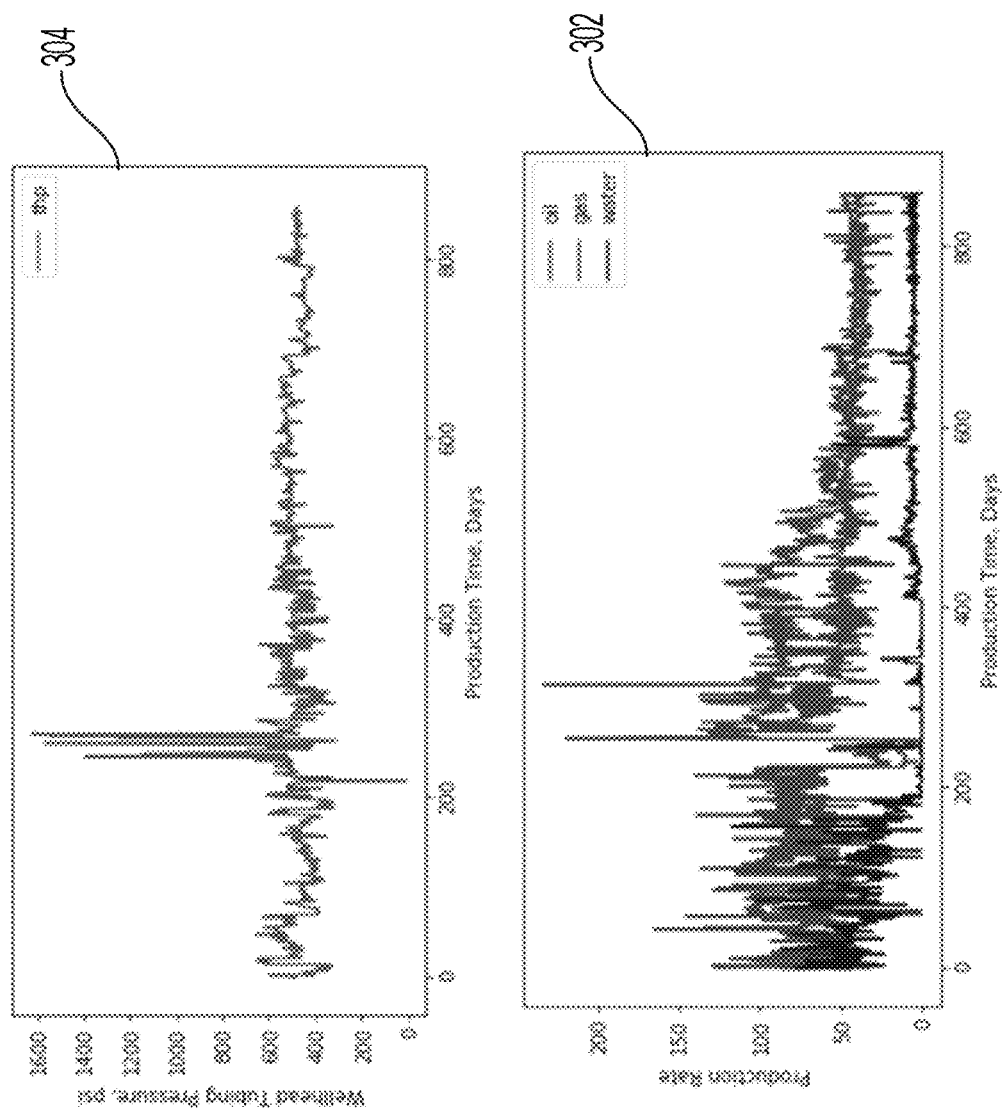
FIG. 3 shows graphs of input and output data for the well productivity system, in accordance with some examples.

FIG. 3 illustrates graphs of input and output data for the well productivity system 201 according to an example. As shown in FIG. 3, input data can include well production responses such as production rate information associated with a well over a production time as shown in graph 302. The production rate information may include oil production information over a period of time, gas production information over a period of time, and water production information over a period of time. The production rate for oil and gas shown in FIG. 3 is shown in BOE or barrels of oil equivalent and the production rate for water is shown in barrels (bbls). In addition, the input data can include well operation constraints over a period of time. Graph 304 shows wellhead tubing pressure in pounds per square inch (PSI) at a well over a period of time. The production rate information could be incremented in amounts per day, as shown in graphs 302 and 304, or per month, or some other time increment.

Figure 4:
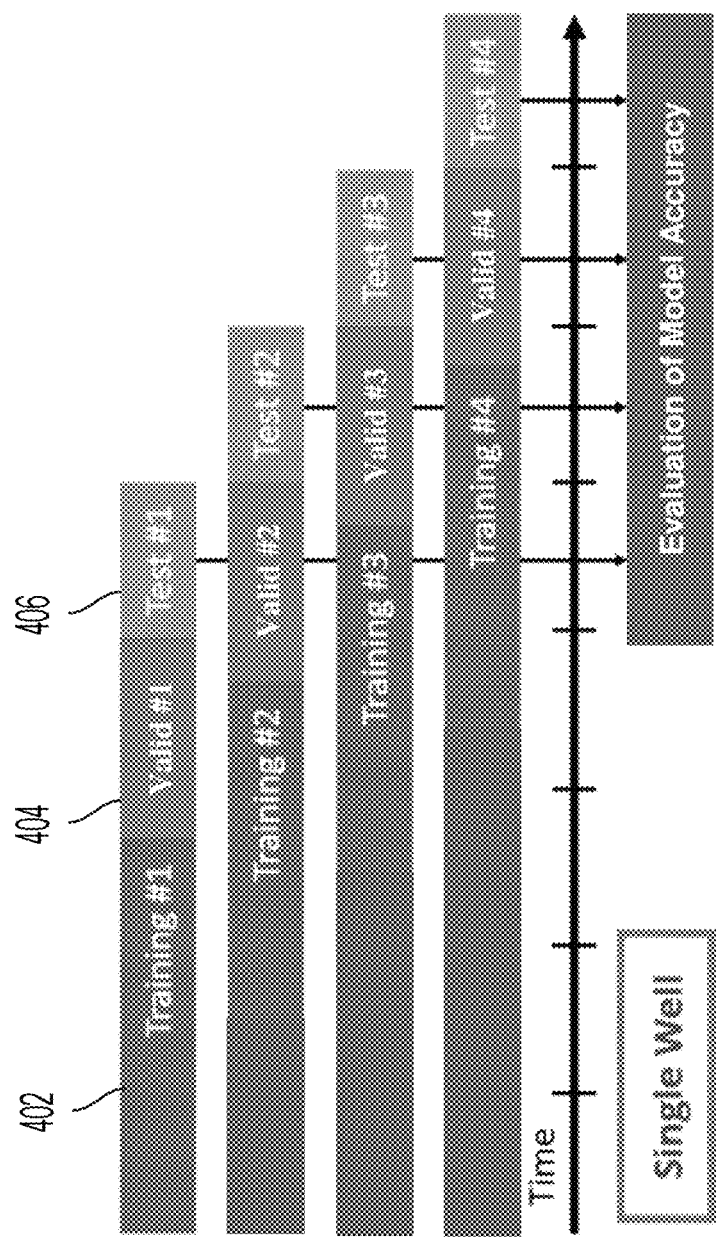
FIG. 4 is a diagram of training, validation, and test data from a single well for developing the well productivity system, in accordance with some examples.

FIG. 4 illustrates a diagram of training, validation, and test data from a single well for developing the well productivity system 201 according to an example. Each subset of training data, validation data, and test data may be selected from the input data. As shown in FIG. 4, the data is associated with a single well and may be divided into a training subset 402, a validation subset 404, and a test subset 406.

For the single well scenario as shown in FIG. 4, a "move-forward" technique is applied to divide a segment of time series into three parts including the training subset, the validation subset, and the test subset. A window interval moves forward in time one step forward and a subsequent set of training, validation, and test data may be established.

FIG. 4 shows that the first training subset, the first validation subset, and the first test subset may be smaller in size than the second training subset, the second validation subset, and the second test subset because there is more data available. In addition, the third training subset, the third validation subset, and the third test subset may be larger than the second training subset, the second validation subset, and the second test subset. The fourth training subset, the fourth validation subset, and the fourth test subset may be larger than the third training subset, the third validation subset, and the third test subset. The process may continue until the window of time reaches an end of an entire time series. A length of each training subset, validation subset, and test subset may be varied to optimize the model. Gradually, the model may become more accurate based on the new data as it is added as input data and overall model prediction accuracy may be based on averaged evaluation scores of all test data subsets. The model accuracy may be evaluated using the first test subset, the second test subset, the third test subset, and the fourth test subset.

Figure 5:
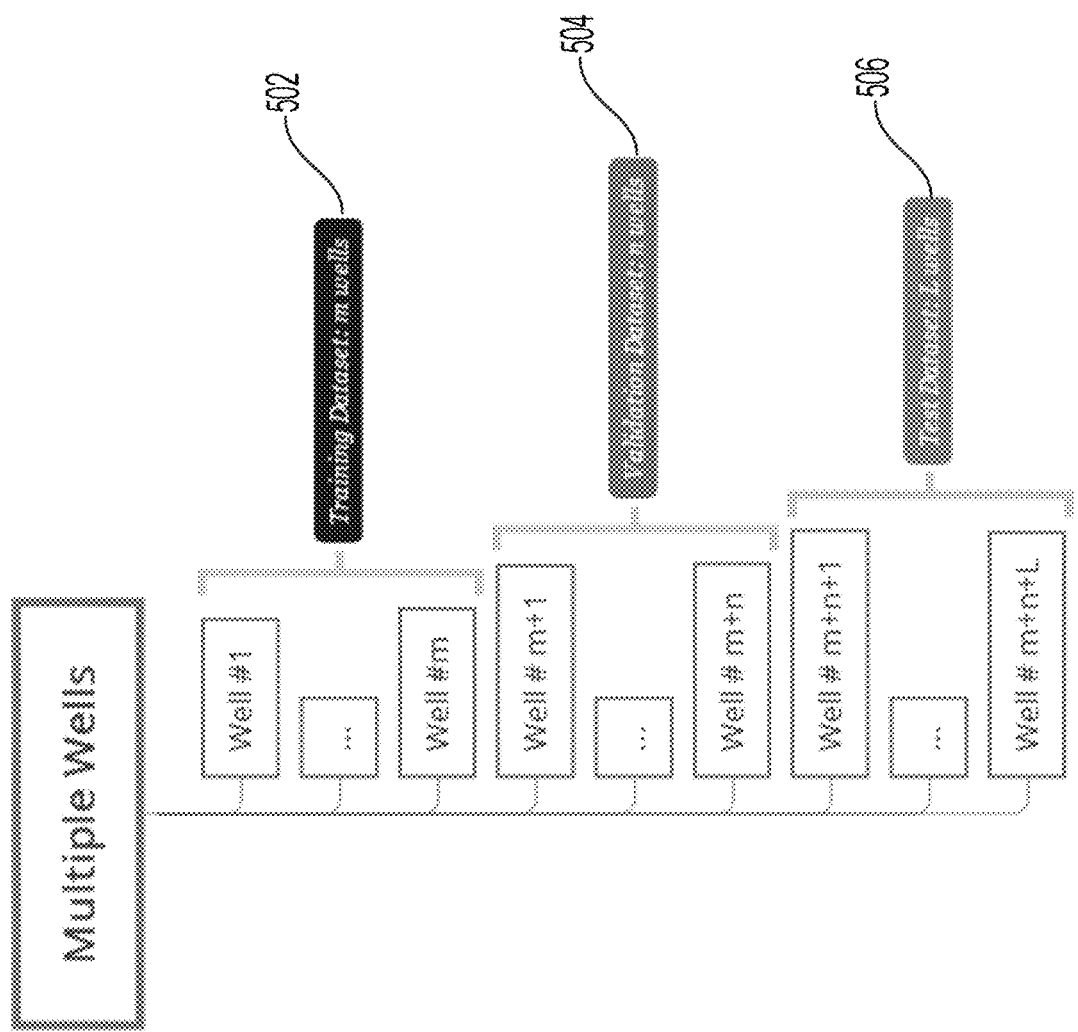
FIG. 5 is a diagram of well dataset input from multiple wells for developing the well productivity system, in accordance with some examples.

FIG. 5 illustrates a diagram of well dataset input from multiple wells for developing the well productivity system 201 according to an example. As shown in FIG. 5, the input data may be from multiple wells and a total number of wells may be randomly divided into a training data subset, a validation data subset, and a test data subset. In this case, the training data subset may be from m wells 502. The validation data subset may be from n wells 504. The test data subset may be from L wells.

The training dataset may include well number one through well number m. The validation dataset may include well number m plus one to well number m+n. The test dataset may include well number m+n+1 to well number m+n+L.

Figure 6:
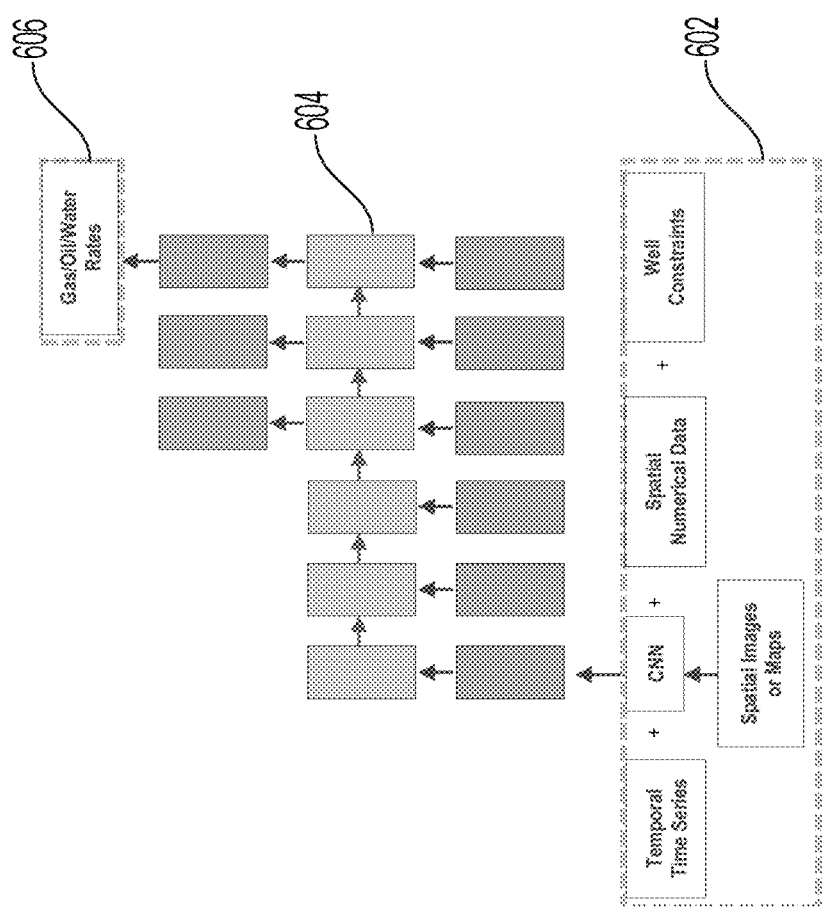
FIG. 6 is a diagram of a model architecture of the well productivity system, in accordance with some examples.

FIG. 6 illustrates a diagram of a model architecture of the well productivity system 201 according to an example. As shown in FIG. 6, an input layer 602 receives input data at each time stamp or each time period. The input data may include temporal time series data, spatial images or maps that are input into a CNN, spatial numerical data, and well constraint data. The model may receive input data at a number of time stamps or number of periods of time as an input sequence. As an example, as shown in FIG. 6, the input data includes data from six time stamps or six periods of time.

The input data 602 is input into a hidden layer 604 that may be LSTM or GRU. An output of production responses may be generated across a same or fewer number of time stamps in the output layer 606. As shown in FIG. 6, there are three time stamps or three periods of time in the output layer 606.

Certain aspects of the model may be tuned by adjusting hyper parameters such as a number of time stamps for the input sequence, a number of time stamps for the output sequence, CNN-related parameters such as kernel size, dropout rate, and learning rate, among others. In this case, the model may be based on LSTM or GRU whereby the output responses are based on previous production rates, well operation constraints, and spatial static data or images, among other input. After the model is trained and validated, a step forward forecast process can be used to perform for one step or one time stamp or multiple steps or time stamps at a time.

Figure 7:
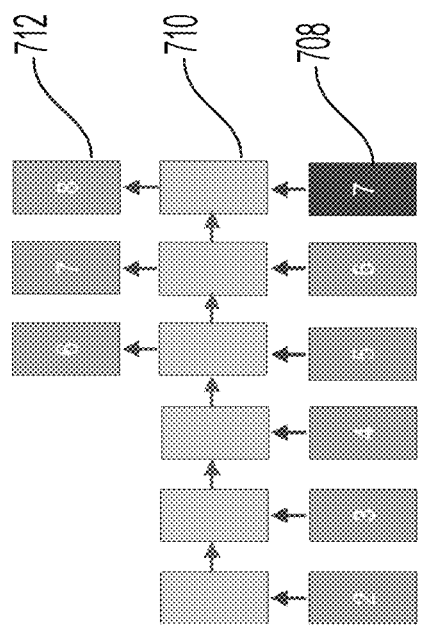
FIG. 7 is a diagram of a one step forward model prediction of the well productivity system, in accordance with some examples.
Figure 7:
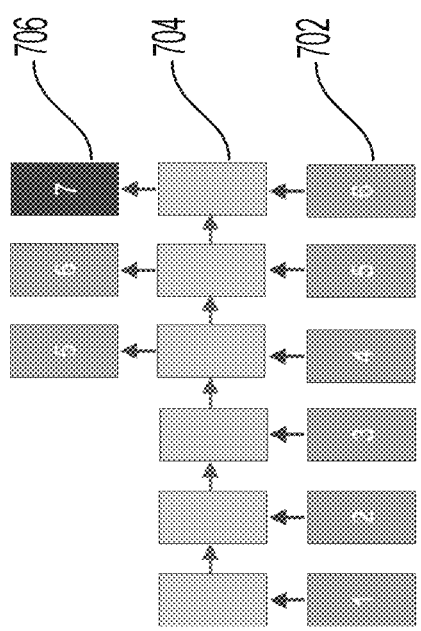

FIG. 7 is a diagram of a one step forward model prediction of the well productivity system 201 according to an example. FIG. 7 illustrates that extracted features from a first time stamp to a sixth time stamp and well constraints from a second time stamp to a seventh time stamp may be used to estimate a well production response at a seventh time stamp. Each time stamp may represent a particular day or another period of time.

As an example, at the input layer 702, the first time stamp to the sixth time stamp may include input data for a well for each day of a week including Monday, Tuesday, Wednesday, Thursday, Friday, and Saturday and well constraints for the well for each day of the week. The hidden layer 704 applies machine learning such as deep learning neural networks and techniques including LSTM or GRU based on previous input data. FIG. 7 then shows that new features are extracted for the seventh time stamp at 706 and may be used in the input sequence 708 to the deep learning techniques in 710 to predict well production responses at an eighth time stamp at 712. As an example, input features may include well production rates for the well and well operation constraints for the well at each time stamp.

Figure 8:
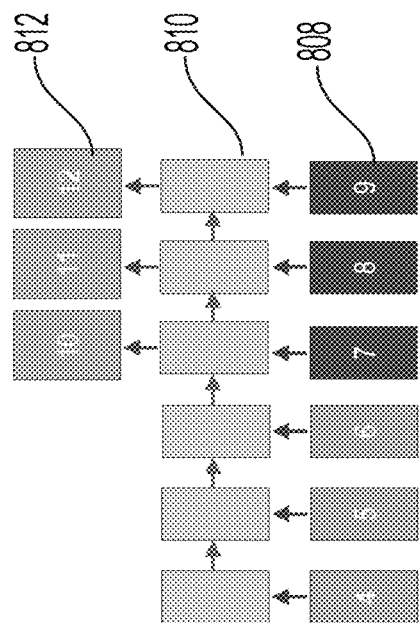
FIG. 8 is a diagram of a multiple step forward model prediction of the well productivity system, in accordance with some examples.
Figure 8:
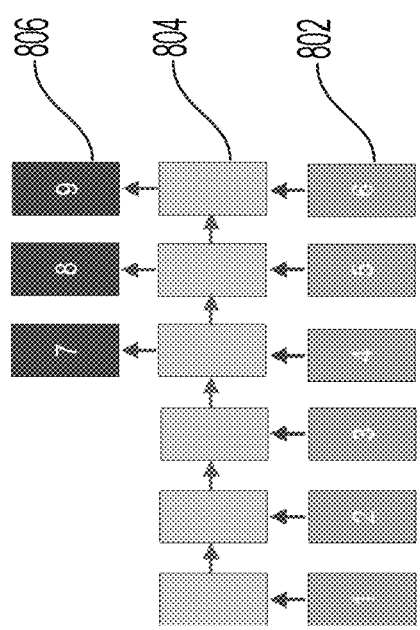

FIG. 8 is a diagram of a multiple step forward model prediction of the well productivity system 201 according to an example. As an example, the input layer 802 illustrates that extracted features from a first time stamp to a sixth time stamp and well constraints from a fourth time stamp to a ninth time stamp may be used to estimate well production responses from the seventh time stamp to the ninth time stamp. The hidden layer 804 applies machine learning such as deep learning neural networks and techniques including LSTM or GRU based on previous input data.

FIG. 8 then shows that new features may be extracted for the seventh time stamp to the ninth time stamp at 806 and may be used in the input sequence 808 to the deep learning techniques in 810 to predict well production responses from the tenth time stamp to the twelfth time stamp at 812. As an example, input features may include well production rates for the well and well operation constraints for the well at each time stamp.

Figure 9:
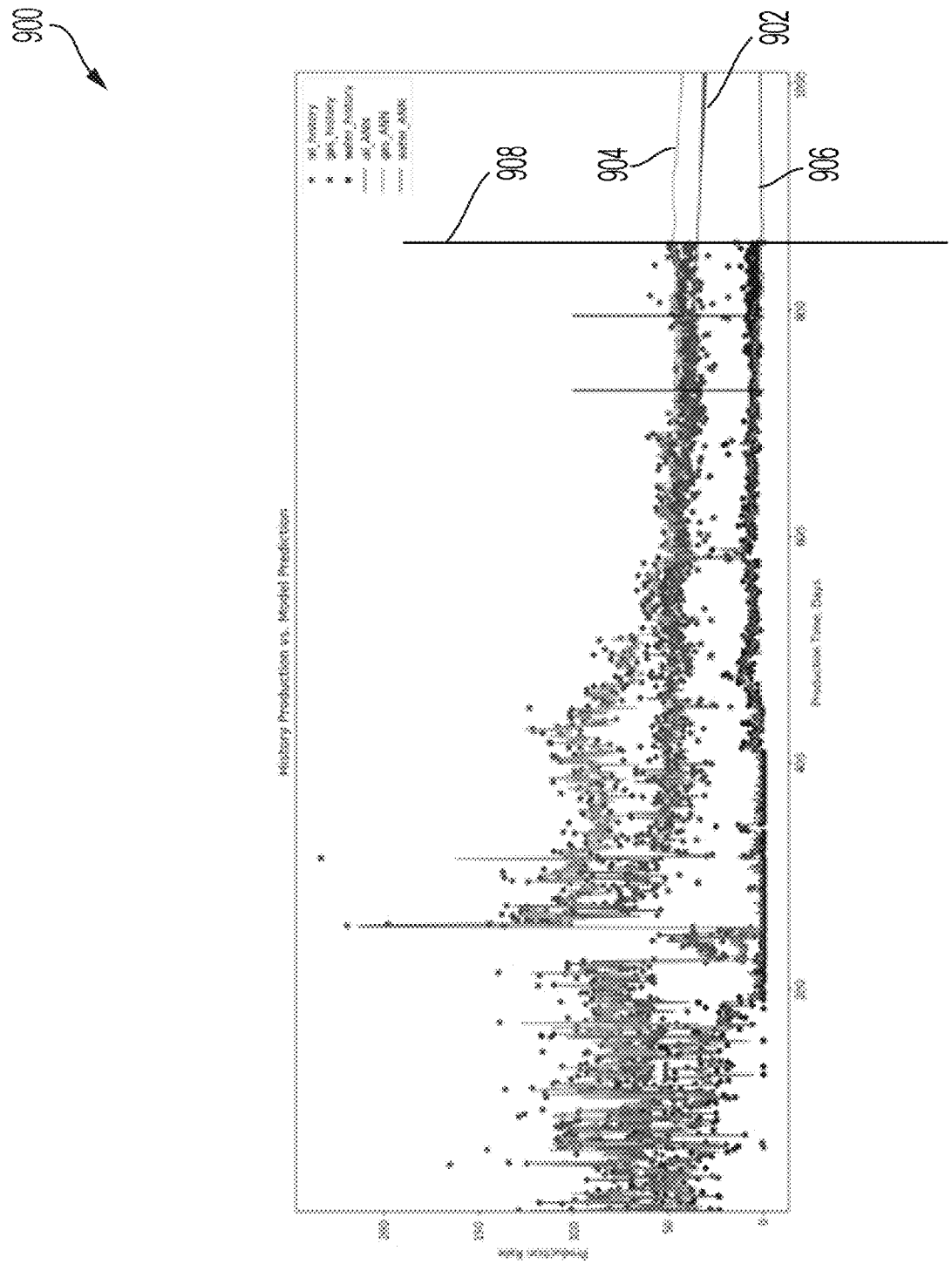
FIG. 9 is a diagram of forecast data from the well productivity system versus real data, in accordance with some examples.

FIG. 9 illustrates a diagram of forecast data from the well productivity system 201 versus real data according to an example. FIG. 9 illustrates historical production and also indicates a model based prediction of production for the future. FIG. 9 shows oil history information including a production rate over a period of time, gas history information including a production rate over a period of time, and water history information including a production rate over a period of time. The production rate shown in FIG. 9 is shown in BOE or barrels of oil equivalent for oil and gas production, and barrels for water production. Each of the data points or dots may represent a production rate in oil, gas, or water for a period of time, e.g., one day. A line or curve is fit to each of the historical data points for each of oil, gas, and water.

In addition, FIG. 9 shows a future oil production rate 902 based on the artificial neural network, a future gas production rate 904 based on the artificial neural network, and a future water production rate 906 based on the artificial neural network. The lines after a current point in time 908 indicate a future prediction of production rate of oil, gas, and water. As shown in FIG. 9, the future oil production rate 902 is shown to be around 35 BOE/day and gradually declines with time. The future gas production rate 904 also is shown to be around 45 BOE/day and gradually declines with time.

After the model is generated, the model may be deployed to a server computing device such as a cloud computing device including the virtual private cloud. Parameters such as operation constraints may be input and modified to determine an impact on well production responses. The well operation may be optimized based on an oil recovery factor and/or a net present value (NPV) and/or other KPI. For instance, the well may be optimized to maximize NPV. Input constraints associated with pumping schedule or hydraulic fracture treatment may be adjusted. A number of stages and types of fluid systems (i.e., slick water with fluid reducer or linear gel) could also be adjusted. In another example, a water-flooding field development plan may be optimized. Input constraints such as water injection period or amount could be adjusted.

FIG. 10 illustrates an example method 1000 for forecasting well productivity accurately and efficiently, in real-time, using deep learning and neural networks. For the sake of clarity, the method 1000 is described in terms of the well productivity system 201, as shown in FIG. 2, configured to practice the method. The steps outlined herein are exemplary and can be implemented in any combination thereof, including combinations that exclude, add, or modify certain steps.

At step 1002, the well productivity system 201 can obtain an input sequence of input data features associated with a well for at least one time stamp during the period of time comprising well production rates for the well and well operation constraints for the well. The input data features associated with the well for the at least one particular time stamp during the period of time further comprise temporal features associated with the well including an oil rate for the at least one particular time stamp during the period of time, a gas rate for the at least one particular time stamp during the period of time, and a water rate for the at least one particular time stamp during the period of time, spatial features associated with the well, and spatial images associated with the well. The spatial images associated with the well may be processed using a convolutional neural network (CNN).

At step 1004, the well productivity system 201 can divide the input data features into a training data subset, a validation data subset, and a test data subset. As shown in FIG. 4, for a single well, the input data features are used to evaluate the model accuracy using the test data subset.

At step 1006, the well productivity system 201 can build a well production model for the well using machine learning based on the training data subset, the validation data subset, and the test data subset. The well production model can built for the well using recurrent neural networks such as long short-term memory (LSTM) or GRU and/or using convolutional neural networks (CNN).

At step 1008, the well productivity system 201 can generate a forecast for the well for a future period of time using the well production model. The forecast may include a future well production rate for the well including at least one of an oil rate, a gas rate, and a water rate. The forecast can be generated for one well or one or more wells using the well production model.

At step 1010, the well productivity system 201 can optimize the well production for the well based on the forecast for the well for the future period of time. The well production model may be deployed to one or more computing devices such as a computing device located downhole or a computing device located on the surface. In addition, the computing device may be a server computing device such as a virtual private cloud.

Having disclosed example systems, methods, and technologies for activating or triggering one or more downhole tools or memory devices based at least in part on one or more surface cues and sensed downhole activities, the disclosure now turns to FIG. 11, which illustrates an example computing device architecture 1100 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

FIG. 11 illustrates an example computing device architecture 1100 of a computing device which can implement the various technologies and techniques described herein. For example, the computing device architecture 1100 can implement the system 201 shown in FIG. 2 and perform various steps, methods, and techniques disclosed herein. The components of the computing device architecture 1100 are shown in electrical communication with each other using a connection 1105, such as a bus. The example computing device architecture 1100 includes a processing unit (CPU or processor) 1110 and a computing device connection 1105 that couples various computing device components including the computing device memory 1115, such as read only memory (ROM) 1120 and random access memory (RAM) 1125, to the processor 1110.

The computing device architecture 1100 can include a cache of high-speed memory connected directly with, in close proximity to, or integrated as part of the processor 1110. The computing device architecture 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other computing device memory 1115 may be available for use as well. The memory 1115 can include multiple different types of memory with different performance characteristics. The processor 1110 can include any general purpose processor and a hardware or software service, such as service 1 1132, service 2 1134, and service 3 1136 stored in storage device 1130, configured to control the processor 1110 as well as a special-purpose processor where software instructions are incorporated into the processor design. The processor 1110 may be a self-contained system, containing multiple cores or processors, a bus, memory controller, cache, etc. A multi-core processor may be symmetric or asymmetric.

To enable user interaction with the computing device architecture 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art, such as a display, projector, television, speaker device, etc. In some instances, multimodal computing devices can enable a user to provide multiple types of input to communicate with the computing device architecture 1100. The communications interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. The storage device 1130 can include services 1132, 1134, 1136 for controlling the processor 1110. Other hardware or software modules are contemplated. The storage device 1130 can be connected to the computing device connection 1105. In one aspect, a hardware module that performs a particular function can include the software component stored in a computer-readable medium in connection with the necessary hardware components, such as the processor 1110, connection 1105, output device 1135, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (for example, microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising obtaining, by at least one processor, an input sequence of input data features associated with a well for at least one time stamp during a period of time, the input data features associated with the well for the at least one particular time stamp during the period of time comprising well production rates for the well and well operation constraints for the well, dividing, by the at least one processor, the input data features into a training data subset, a validation data subset, and a test data subset, building, by the at least one processor, a well production model for the well using machine learning based on the training data subset, the validation data subset, and the test data subset, and generating, by the at least one processor, a forecast for the well for a future period of time using the well production model, the forecast comprising a future well production rate for the well including at least one of an oil rate, a gas rate, and a water rate.

Statement 2: A method according to Statement 1, further comprising optimizing well production for the well based on the forecast for the well for the future period of time.

Statement 3: A method according to any of Statements 1 and 2, wherein the input data features associated with the well for the at least one particular time stamp during the period of time further comprise temporal features associated with the well including an oil rate for the at least one particular time stamp during the period of time, a gas rate for the at least one particular time stamp during the period of time, and a water rate for the at least one particular time stamp during the period of time, spatial features associated with the well, and spatial images associated with the well.

Statement 4: A method according to any of Statements 1 through 3, further comprising processing the spatial images associated with the well using a convolutional neural network (CNN).

Statement 5: A method according to any of Statements 1 through 4, further comprising building the well production model for the well using one of long short-term memory (LSTM) and gated recurrent unit (GRU).

Statement 6: A method according to any of Statements 1 through 5, wherein the well is a first well, the method further comprising generating a forecast for a future period of time using the well production model for the first well and a second well different from the first well.

Statement 7: A method according to any of Statements 1 through 6, further comprising deploying the well production model to a server computing device.

Statement 8: A system comprising, at least one processor coupled with at least one computer-readable storage medium having stored therein instructions which, when executed by the at least one processor, causes the system to: obtain an input sequence of input data features associated with a well for at least one time stamp during a period of time, the input data features associated with the well for the at least one particular time stamp during the period of time comprising well production rates for the well and well operation constraints for the well, divide the input data features into a training data subset, a validation data subset, and a test data subset, build a well production model for the well using machine learning based on the training data subset, the validation data subset, and the test data subset, and generate a forecast for the well for a future period of time using the well production model, the forecast comprising a future well production rate for the well including at least one of an oil rate, a gas rate, and a water rate.

Statement 9: A system according to Statement 8, the at least one processor further to optimize well production for the well based on the forecast for the well for the future period of time.

Statement 10: A system according to any of Statements 8 and 9, wherein the input data features associated with the well for the at least one particular time stamp during the period of time further comprise temporal features associated with the well including an oil rate for the at least one particular time stamp during the period of time, a gas rate for the at least one particular time stamp during the period of time, and a water rate for the at least one particular time stamp during the period of time, spatial features associated with the well, and spatial images associated with the well.

Statement 11: A system according to any of Statements 8 through 10, the at least one processor further to process the spatial images associated with the well using a convolutional neural network (CNN).

Statement 12: A system according to any of Statements 8 through 11, the at least one processor further to build the well production model for the well using one of long short-term memory (LSTM) and gated recurrent unit (GRU).

Statement 13: A system according to any of Statements 8 through 12, wherein the well is a first well, the at least one processor further to generate a forecast for a future period of time using the well production model for the first well and a second well different from the first well.

Statement 14: A system according to any of Statements 8 through 13, further to deploy the well production model to a server computing device.

Statement 15: A system according to any of Statements 8 through 14, further to deploy the well production model to a virtual private cloud.

Statement 16: A non-transitory computer-readable storage medium comprising instructions stored on the non-transitory computer-readable storage medium, the instructions, when executed by one more processors, cause the one or more processors to perform operations including: obtaining an input sequence of input data features associated with a well for at least one time stamp during a period of time, the input data features associated with the well for the at least one particular time stamp during the period of time comprising well production rates for the well and well operation constraints for the well, dividing the input data features into a training data subset, a validation data subset, and a test data subset, building a well production model for the well using machine learning based on the training data subset, the validation data subset, and the test data subset, and generating a forecast for the well for a future period of time using the well production model, the forecast comprising a future well production rate for the well including at least one of an oil rate, a gas rate, and a water rate.

Statement 17: A non-transitory computer-readable storage medium according to Statement 16, the operations further comprising optimizing well production for the well based on the forecast for the well for the future period of time.

Statement 18: A non-transitory computer-readable storage medium according to any of Statements 16 and 17, wherein the input data features associated with the well for the at least one particular time stamp during the period of time further comprise temporal features associated with the well including an oil rate for the at least one particular time stamp during the period of time, a gas rate for the at least one particular time stamp during the period of time, and a water rate for the at least one particular time stamp during the period of time, spatial features associated with the well, and spatial images associated with the well.

Statement 19: A non-transitory computer-readable storage medium according to any of Statements 16 through 18, the operations further comprising processing the spatial images associated with the well using a convolutional neural network (CNN).

Statement 20: A non-transitory computer-readable storage medium according to any of Statements 16 through 19, the operations further comprising building the well production model for the well using one of long short-term memory (LSTM) and gated recurrent unit (GRU).

Statement 21: A system comprising means for performing a method according to any of Statements 1 through 7.

We claim:

1. A method comprising:
    obtaining, by at least one processor, an input sequence of input data features associated with a well for at least one time stamp during a period of time, the input data features associated with the well for the at least one particular time stamp during the period of time comprising well production rates for the well and well operation constraints for the well;
    dividing, by the at least one processor, the input data features into a training data subset, a validation data subset, and a test data subset;

building, by the at least one processor, a well production model for the well using machine learning based on the training data subset, the validation data subset, and the test data subset;
building the well production model for the well using one of long short-term memory (LSTM) and gated recurrent unit (GRU); and
generating, by the at least one processor, a forecast for the well for a future period of time using the well production model, the forecast comprising a future well production rate for the well including at least one of an oil rate, a gas rate, and a water rate.

2. The method of claim 1, further comprising optimizing well production for the well based on the forecast for the well for the future period of time.

3. The method of claim 1, wherein the input data features associated with the well for the at least one particular time stamp during the period of time further comprise temporal features associated with the well including an oil rate for the at least one particular time stamp during the period of time, a gas rate for the at least one particular time stamp during the period of time, and a water rate for the at least one particular time stamp during the period of time, spatial features associated with the well, and spatial images associated with the well.

4. The method of claim 1, further comprising processing the spatial images associated with the well using a convolutional neural network (CNN).

5. The method of claim 1, wherein the well is a first well, the method further comprising generating a forecast for a future period of time using the well production model for the first well and a second well different from the first well.

6. The method of claim 1, further comprising deploying the well production model to a server computing device.

7. A system comprising:
at least one processor coupled with at least one computer-readable storage medium having stored therein instructions which, when executed by the at least one processor, causes the system to:
obtain an input sequence of input data features associated with a well for at least one time stamp during a period of time, the input data features associated with the well for the at least one particular time stamp during the period of time comprising well production rates for the well and well operation constraints for the well;
divide the input data features into a training data subset, a validation data subset, and a test data subset;
build a well production model for the well using machine learning based on the training data subset, the validation data subset, and the test data subset;
building the well production model for the well using one of long short-term memory (LSTM) and gated recurrent unit (GRU); and
generate a forecast for the well for a future period of time using the well production model, the forecast comprising a future well production rate for the well including at least one of an oil rate, a gas rate, and a water rate.

8. The system of claim 7, the at least one processor further to optimize well production for the well based on the forecast for the well for the future period of time.

9. The system of claim 7, wherein the input data features associated with the well for the at least one particular time stamp during the period of time further comprise temporal features associated with the well including an oil rate for the at least one particular time stamp during the period of time, a gas rate for the at least one particular time stamp during the period of time, and a water rate for the at least one particular time stamp during the period of time, spatial features associated with the well, and spatial images associated with the well.

10. The system of claim 7, the at least one processor further to process the spatial images associated with the well using a convolutional neural network (CNN).

11. The system of claim 7, wherein the well is a first well, the at least one processor further to generate a forecast for a future period of time using the well production model for the first well and a second well different from the first well.

12. The system of claim 7, the at least one processor further to deploy the well production model to a server computing device.

13. The system of claim 7, the at least one processor further to deploy the well production model to a virtual private cloud.

14. A non-transitory computer-readable medium having instructions stored thereon that, when executed by at least one processor, cause the at least one processor to perform operations comprising:
obtaining an input sequence of input data features associated with a well for at least one time stamp during a period of time, the input data features associated with the well for the at least one particular time stamp during the period of time comprising well production rates for the well and well operation constraints for the well;
dividing the input data features into a training data subset, a validation data subset, and a test data subset;
building a well production model for the well using machine learning based on the training data subset, the validation data subset, and the test data subset;
building the well production model for the well using one of long short-term memory (LSTM) and gated recurrent unit (GRU); and
generating a forecast for the well for a future period of time using the well production model, the forecast comprising a future well production rate for the well including at least one of an oil rate, a gas rate, and a water rate.

15. The non-transitory computer-readable medium of claim 14, the operations further comprising optimizing well production for the well based on the forecast for the well for the future period of time.

16. The non-transitory computer-readable medium of claim 14, wherein the input data features associated with the well for the at least one particular time stamp during the period of time further comprise temporal features associated with the well including an oil rate for the at least one particular time stamp during the period of time, a gas rate for the at least one particular time stamp during the period of time, and a water rate for the at least one particular time stamp during the period of time, spatial features associated with the well, and spatial images associated with the well.

17. The non-transitory computer-readable medium of claim 14, the operations further comprising processing the spatial images associated with the well using a convolutional neural network (CNN).

* * * * *